May 13, 1969      W. W. FISHER      3,444,481

INVERTER STARTING CIRCUIT

Filed May 31, 1967

INVENTOR.
WILLIAM W. FISHER
BY
his ATTORNEYS

INVENTOR.
WILLIAM W. FISHER
BY
Brumbaugh, Free, Graves & Donohue
his ATTORNEYS

United States Patent Office 3,444,481
Patented May 13, 1969

3,444,481
INVERTER STARTING CIRCUIT
William W. Fisher, Woodstock, N.Y., assignor to Rotron Manufacturing Company, Inc., Woodstock, N.Y., a corporation of New York
Filed May 31, 1967, Ser. No. 642,432
Int. Cl. H03k 3/281
U.S. Cl. 331—113                              6 Claims

ABSTRACT OF THE DISCLOSURE

A starting circuit for inverters of the type including a pair of transistors having output electrodes connected to the output winding of transformer and control electrodes connected to feed-back windings on the transformer to render the transistors alternately conducting, in which the input and output electrodes of a third transistor are connected in a series path between the control electrode of one of the pair of transistors and a terminal of a direct current source so as to positively drive the one transistor into an initially conductive condition when the third transistor is conductive. A timing circuit isolates the starting transistor from the inverter after a predetermined time by biasing the starting transistor to cut-off.

Background of the invention

This invention relates to starting circuits for inverter type oscillators, and more particularly to an inverter starting circuit which creates a conductive imbalance between a pair of switching devices, such as transistors, during start-up to initiate regenerative oscillation of the inverter.

Most D.C. to A.C. inverters employ two, and sometimes four, siwtching devices, which may be either vacuum tubes or transistors, controlled by a feed-back signal to conduct current alternately to an output winding. In two-transistor inverter circuits the output winding is usually center-tapped for conventional push-pull operation. In four-transistor inverter circuits, the transistors are connected in a bridge configuration, such as that shown in U.S. Patent No. 3,080,534 to Paynter, with diagonally opposed transistors making up alternately conducting pairs for respectively transferring current in opposite directions through the output winding.

Usually, one form or another of inductive coupling is used to sense the voltage developed across the output winding and generates a feed-back signal which biases respective ones of the transistors or transistor pairs to alternately conducting and non-conducting conditions. Operation of such inverter circuits is initiated by an imbalance of current conduction through the individual transistors or vacuum tubes, thereby resulting in a net current flow through the output winding. The initial rate of change of flux in the output winding accompanying that net current is sufficient to generate feed-back signals productive of regenerative oscillations. Vacuum tube inverter circuits start rather reliably because, it has been found, the thermal noise characteristics of the vacuum tubes create the required imbalance to initiate operation. In transistor inverter circuits, however, the conductive imbalance between the transistors or transistor pairs is not always sufficient to reliably trigger the inverter circuit into operation. This is particularly true when the applied voltage rise is slow (for example, less than 1 volt per second), or when the ambient tempearture of the transistors is low. Under such conditions, the biasing feed-back signal is weak and it is necessary to employ a starting circuit of some sort to create the conductive imbalance necessary to precipitate alternate conduction of the switching transistors.

Any number of inverter starting circuits have already been proposed, most of which are designed to provide for heavy conduction of one or both of the switching transistors upon application of the direct current source. Representative starting cidcuit arrangements presently known may be found in U.S. Patents Nos. 3,160,830, 2,922,958, 3,098,201 and 3,159,799. Although the starting circuits disclosed in those patents operate satisfactorily, some of them have the disadvantage that the starting circuit presents a constant drain on the direct current power supply, and this is particularly disadvantageous where the direct current source is a battery of limited storage capacity. In other of the disclosed circuits, reliance is placed on the unequal conductive properties of the switching transistors, which may be too slight to reliably trigger inverter oscillations. A further disadvantage of many of the devices disclosed in the noted patents is the complexity of the circuits.

Accordingly, it is among the primary objects of this invention to provide improved starting circuits for inverter type oscillators, which overcome the disadvantages of the prior art.

Another object of the invention is to provide starting circuits for transistorized inverters which do not present a constant current drain on the energizing direct current source.

A further object of this invention is to provide inverter starting circuits which operate independently of an imbalance in the conductive characteristics of the inverter transistors.

Yet another object of this invention is to provide improved starting circuits which may be incorporated into inverters at relatively low cost and which positively initiate inverter action by placing a single switching transistor or transistor pair in the conductive region.

Still another object of the invention is to provide inverter starting circuits which operate reliably under ambient temperature extremes and slow rates of application of direct current source voltages.

In brief, these and other objects of the invention are attained by the provision of a starting circuit which includes current control means, such as a third transistor, of which the input and output terminals thereof are connected in a series circuit between a terminal of the direct current source and the control electrode of one of the switching devices. A bias circuit is connected between the control terminal of the current control means for rendering the current path between the input and output terminals thereof at least initially conductive to establish current flow in the series circuit. This current flow is used to develop a bias voltage for consistently driving the one switching device into an initially conductive condition to produce the first cycle of the periodic output waveform across the inverter output winding.

In a preferred embodiment of the invention, the current control means is a third transistor of which the base electrode is connected to bias means comprising a parallel resistance-capacitance network. This network is charged, on application of the direct current power, by the current flowing between the emitter and base of the third transistor. When the charge upon the capacitor reaches a predetermined value, the third transistor is rendered substantially non-conductive and current flow in the series circuit stops, thereby isolating the starting circuit from the inverter after oscillations have been initiated. Additionally, the capacitor in the resistance-capacitance network is maintained charged to a value which prevents reconduction of the third transistor once the inverter circuit is operating.

For a better understanding of the invention, together with the further objects and advantages thereof, reference may be made to the following detailed description and to the drawings, in which.

Figure 1:
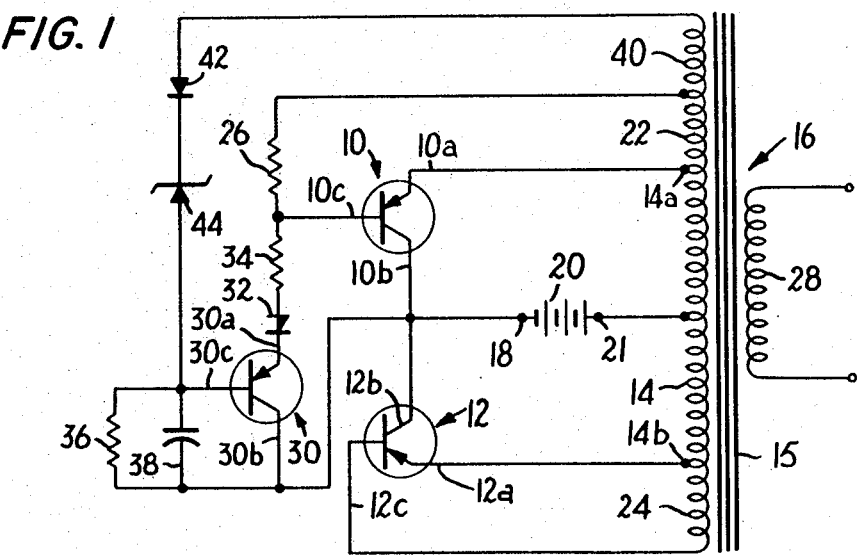
FIGURE 1 is an electrical schematic diagram of a two-transistor inverter employing a starting circuit according to the invention.
Figure 2:
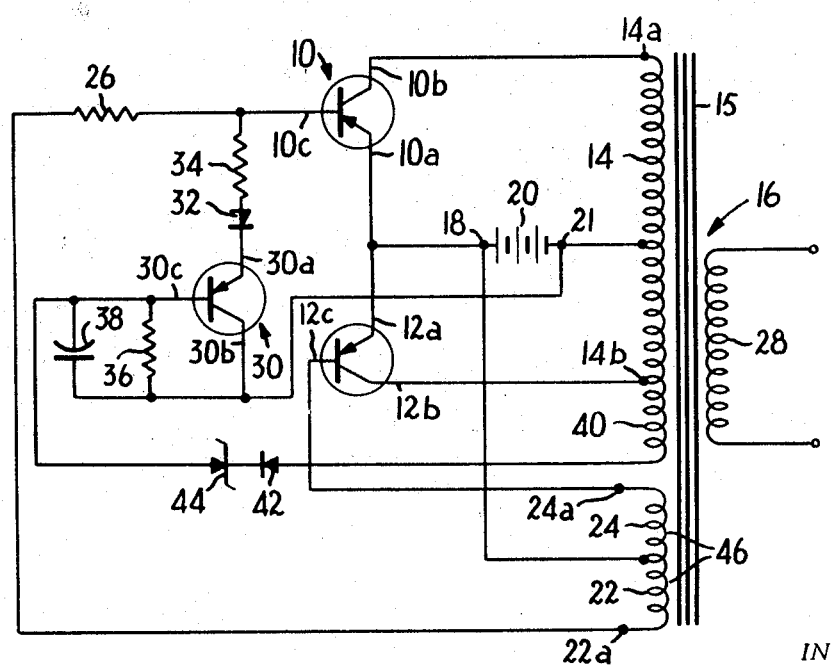
FIGURE 2 is an electrical schematic diagram of another form of starting circuit according to the invention in a two-transistor inverter.
Figure 3:
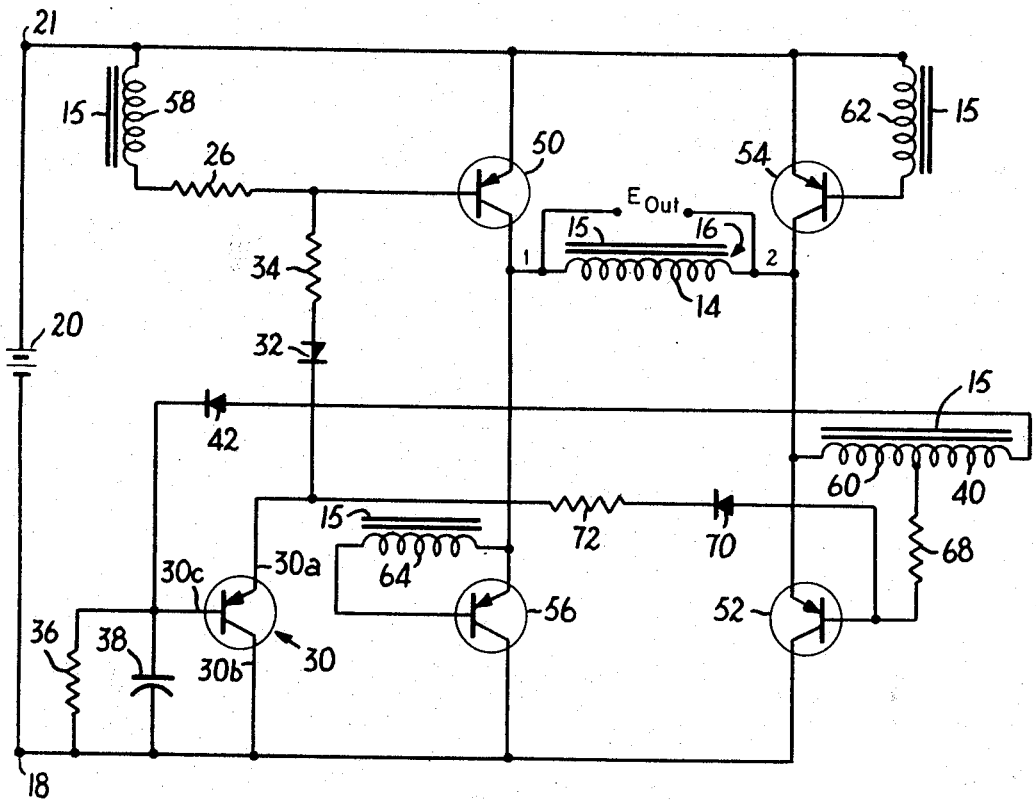
FIGURE 3 is an electrical schematic diagram of a bridge-type transistorized inverter including a starting circuit according to the invention.

FIGURES 1, 2 and 3 show starting circuits according to the invention incorporated into transistor inverter circuits having various types of feed-back connections. In FIGURE 1, the inverter itself is seen to include a pair of switching transistors 10, 12 of which the input electrodes, or emitters 10a, 12a are connected by way of end terminals 14a, 14b across a center-tapped output winding 14 of the output transformer 16. The output electrodes, or collectors 10b, 12b, are joined together and connected to a common terminal 18 of the direct current source, here represented by a battery 20. The other terminal 21 of the the direct current source is connected to the center tap of the output winding 14. Feed-back windings 22, 24 of the output transformer 16 are connected between the control terminals, or bases 10c, 12c, and emitters 10a, 12a of the respective transistors. In the case of transistor 12, the feed-back winding 24 is connected directly between the emitter 12a and base 12c, and in the case of the transistor 10, the feedback winding 22 is connected in series with a resistor 26 (the purpose of which will be explained shortly) between the emitter 10a and the base 10c. The periodic output voltage produced by this circuit appears across the secondary winding 28 of the transformer 16.

The elements thus far described comprise one of the simplest types of transistor inverters and, ignoring for the moment the remaining elements of the FIGURE 1 circuit, the operation of this kind of inverter will be described briefly. When the battery 20 is connected between the terminals 18, 21 a pair of current loop paths may exist, each including one half of the center-tapped output winding 14 and the emitter-collector circuit of a respective one of the transistors 10, 12. If, upon application of direct current voltage to the circuit, one of the transistors 10, 12 tends to conduct more current than the other, a net flux rise will appear in the core 15 of the transformer 16 and feedback voltages will be generated in the windings 22, 24. These feedback windings are polarized such that the polarities of the voltages applied between the bases and emitters of the transistors 10, 12 are opposite; therefore, the feedback from one of the feeback windings will tend to drive its associated transistor into the conductive region, while the voltage derived from the other feedback winding tends to place the other transistor in a low conductive state.

The next flux in the transformer core increases to some maximum value determined by the voltage of the applied D.C. source 20 and/or the saturation level of the core 15. At this point, the rate of change of flux in the core approaches zero, causing the feedback voltages to diminish accordingly. This results in cut-off of the initally conducting transistor because of insufficient forward bias between its emitter and base electrodes. Additionally, the sudden collapse of flux in the transformer core induces voltages of reverse polarities in the feedback windings 22, 24, thus switching the other transistor "on" and biasing the initially conducting transistor further into cut-off. When the transformer core flux rise again diminishes to zero, the exchange between conduction of the transistors 10, 12 again takes place and, thus, a full period or cycle of oscillation is completed.

From the foregoing, it is readily realized that the inverter cannot start if the voltage rise in the current loops established by connection of the direct current source 20 is slow enough to prevent the development of sufficient feedback voltages in the windings 22, 24, or if each of the transistors 10, 12 conducts equally. In the latter case, no net flux will exist in the transformer core 15.

In accordance with the invention, however, positive starting of the inverter is provided by driving or biasing the transistor 10 into its conductive condition upon application of the direct current source 20. This function is accomplished by a third transistor 30 of which the emitter 30a and collector 30b are connected in a series path between the common terminal 18 and the base 10c of the transistor 10. This series circuit includes, as well, a diode 32 and a current limiting resistor 34. The current through the series circuit is controlled by the voltage developed across a bias network comprising a parallel connection of a resistor 36 and a capacitor 38 and connected between the transistor collector electrode 30b and base electrode 30c.

When the battery 20 is connected between the terminals 18 and 21, a series current loop exists from the terminal 21 through one-half the output winding 14, the feedback winding 22, resistors 26 and 34, diode 32 and the emitter-collector circuit of the transistor 30 to the negative terminal 18. The diode 32 is a special purpose semiconductor (e.g., Motorola M4L3052) which holds off current flow in this loop until the voltage at its anode, and therefore at the transistor base 10c, reaches the forward break-over voltage, at which time a current surge occurs from the emitter 30a to base 30c to precipitate heavy conduction of the transistor 30. At this point the capacitor 38 begins to accumulate a charge due to the flow of current from the emitter 30a to the base 30c, and the emitter-collector path of the transistor 30 is conductive.

Once current flow has been established through the series circuit of elements 34, 32 and 30a–30b, a voltage drop appears across the resistor 26 to decidedly bias the transistor 10 to its conductive state. Upon conduction of the transistor 10, the flux polarity and increase in the transformer core 15 is such that a regenerative feedback voltage is applied across the base and emitter electrodes 10a, 10c of the transistor 10, while the feedback voltage derived from the winding 24 maintains the transistor 12 in a low, or non-conducting, state. Meanwhile, the capacitor 38 continues to charge until the voltage developed across the parallel resistance-capacitance circuit raises the potential of the base 30c above the potential at the emitter 30a. At this point, the transistor 30 is rendered non-conductive and current flow through the series circuit ceases, thus isolating the starting circuit from the inverter.

The discharge time constant associated with the resistor 36 and capacitor 38 is selected to be longer than the period between successive cycles of inverter oscillation, thus preventing discharge of the capacitor 38 and reinitiation of conduction of the transistor 30 before one cycle of oscillation has been completed.

On the second half of the inverter oscillation period, i.e., when the transistor 10 is non-conductive and the transistor 12 is conductive, the voltage developed across the non-conducting half of the output winding 14 and the feedback winding 22 adds to the applied direct current voltage such that the emitter 30a of the starting transistor tends to become more positive than the base 30c. To prevent reinitiation of conduction of the transistor 30 under these conditions, that higher voltage plus an additional voltage derived from a further winding 40 in series with the feedback winding 22 is applied to the diode 42 and Zener diode 44. When the sum of those voltages, i.e., the voltage between the terminal 21 and anode of diode 42, exceeds the potential at the base 30c of the starting transistor by an amount equal to the sum of the forward break-over voltage of the diode 42 and the Zener voltage of the diode 44, the diodes 42 and 44 conduct to immediately bring the base 30c to a potential greater than the potential at the emitter 30a, thus maintaining the starting transistor in a non-conductive state.

From the foregoing, it will be appreciated that the starting circuit is effective to drive one inverter transistor into conduction upon application of the direct current source voltage, and does not depend upon a mismatch or imbalance of the conductive propreties of the transistors. Moreover, once the inverter has swung into full operation, the starting circuit is completely isolated from the inverter circuit alone.

FIGURE 2 illustrates an inverter which is similar to that shown in FIGURE 1, but basically differing from the FIGURE 1 circuit in that a common emitter, rather than common collector, configuration of the switching transistors 10, 12 is used. In addition, the arrangements of the feedback windings 22, 24 and the winding 40 are somewhat modified. As shown, the feedback windings 22, 24 comprise one-half of the center-tapped winding 46, with the center tap being connected directly to the common terminal 18 and the end terminals 22a, 24a to the bases 10c, 12c, respectively. In this case, the collector 30b of the starting transistor is tied to the negative terminal (now 21) rather than the terminal 18 of the direct current source, and the winding 40 for supplying a cut-off voltage to the base 30c of the starting transistor is joined directly to one side of the output winding 14. Aside from these modifications, the circuit of FIGURE 2 operates identically to the FIGURE 1 circuit.

FIGURE 3 depicts a similar starting circuit connected in a bridge-type inverter circuit. A more detailed description of bridge-type inverter circuits and their operation may be found in U.S. Patents Nos. 3,080,534 and 3,098,-200 to Paynter and Jenson, respectively, Generally, this type of circuit differs from those shown in FIGURES 1 and 2 in the use of a pair of switching transistors in place of each single switching transistor, and the transistors in each pair conduct simultaneously. In FIGURE 3, the first switching transistor pair comprises transistors 50 and 52 connected in series with the output winding 14 across the direct current source 20. The second pair, also connected in series with the output winding 14 across the direct current source, comprises the transistors 54 and 56. During one half-cycle of inverter operation, the transistors 50 and 52 conduct simultaneously to establish current flow in one direction through the winding 14, whereas during the other half of the cycle, the transistors 54 and 56 conduct to send current in the opposite direction through the output winding. This action of the switching transistors results in current flow that reverses in direction through the winding 14 after every half-cycle of inverter oscillations.

Inductively coupled to the output winding 14 by the core 15 are feedback windings 58, 60, 62 and 64 which render the transistor pairs 50, 52 and 54, 56 alternately conducting and non-conducting by providing proper bias voltages to the individual emtter-base circuits. Thus, for example, when the polarity of the voltages induced in the feedback windings 58 and 60 are such to provide conduction of transistors 50 and 52, the polarity of the voltages induced in the windings 62 and 64 are such that the transistors 54 and 56 are substantially non-conductive. In this manner an alternating current voltage is produced across the terminals of the output winding 14. It is seen that the elements of the starting circuit are provided with connections analogous to those described in connection with FIGURES 1 and 2, and for convenience have been identified with the same numerals.

When the battery 20 is connected between the terminals 18 and 21, a current path exists through the feedback winding 58, resistor 26 and the series circuit of resistor 34, diode 32 and the emitter-collector path of the starting transistor 30. Current flow through this circuit biases the transistor 50 to a conductive state, providing a path for current in the output winding 14 through the feedback winding 60, a resistor 68, diode 70, resistor 72 and the emitter-collector path of the starting transistor 30. The flow of current biases the transistor 52 to a conducting condition. Once conduction of the transistor 52 takes place, the current through the output winding 14 follows primarily the emitter-collector path through this transistor. With the establishment of current through the output winding 14, feedback voltages in the windings 58 and 60 drive each of the transistors 50 and 52 into its fully conducting state, limited by the consideration noted above in connection with FIGURE 1. Meanwhile, the capacitor 38 continues to charge, as explained previously, until it is impressed with a voltage sufficient to place the transistor 30 in a low conductive condition.

The resistor 68 connected in series with the feedback winding 60 between the emitter and base of the transistor 52 ensures that this transistor will be forwardly biased when the transistor 50 conducts. Diode 70 isolates the base of the transistor 52 from any higher potential at the emitter 30a of the starting transistor after one cycle of oscillation has been completed. At the end of the first cycle of operation, when the flux in the core 15 of the transformer 16 collapses, voltages developed across the feedback windings 62 and 64 are effective to trigger the second pair of transistors 54 and 56 into conduction, while the voltages across the feedback windings 58 and 60 render the transistors 50 and 52 non-conductive.

Upon conduction of the transistor 54, a current path is provided through the feedback winding 60, the winding 40 (which also is inductively coupled to the output winding 14) and the diode 42 to the base 30c of the starting transistor to further charge the capacitor 38 and maintain the transistor 30 in its non-conducting condition. The polarization of the series-connected windings 60, 40 is such that, during the second half-cycle of operation, the voltage generated in these two windings adds to the power supply voltage to impress the base 30c of the starting transistor with a potential that is higher than the potential at the emitter 30a. The emitter 30a, of course, assumes approximately the potential of the positive terminal of the direct current source during this period of time, and is therefore at a lower potential than the base 30c. Since the time constant of the resistor 36 and capacitor 38 is greater than the period of one cycle of inverter oscillation, the transistor 30 thereafter remains "off" as long as oscillations continue, due to periodic recharging of the capacitor 38 via diode 42 during the second half-cycles of the output waveform.

It is apparent from the foregoing that the present invention provides a reliable, low-cost starting circuit for all types of inverters. This starting circuit insures reliable initiation of oscillations of the basic inverter circuit under extreme temperature and voltage conditions, without depending on any mismatch of the inverter switching devices. The starting circuit also assures its isolation from the direct current source once operation of the inverter has been successfully accomplished.

It is understood that the embodiments of the invention disclosed herein are exemplary only and that certain modifications and variations in circuit details will occur to those skilled in the art. Accordingly, all such modifications and variations are intended to be included within the scope and spirit of the appended claims.

I claim:

1. In an oscillator of the type including first and second switch means having input, output and control electrodes, and output winding connected between ones of the respective input and output electrodes across which a periodic waveform output signal is developed, a direct current source connected to apply a direct current potential across the input and output electrodes of the respective switch means, and feedback circuit means sensitive to the output signal and coupled to the control electrodes of the respective switch means for rendering the respective switch means alternately conductive between the input and output electrodes thereof, a starting circuit for positively initiating alternately conducting operation of the first and second switch means, comprising:

current control means having input, output and control terminals;

means for connecting the input and output terminals in a series circuit exclusive of the feedback circuit means between a terminal of the direct current source and the control electrode of the first switch means;

bias means connected to the control terminal of the current control means for controllably rendering the current control means at least initially conductive between the input and output terminals thereof to establish current flow in the series circuit irrespective of the conductive state of said switch means, said bias means providing a conductive path for current initially conducted through the control terminal and establishing a bias potential at said control terminal to render said current control means substantially non-conductive after a given increment of time;

means coupled to and responsive to the current flow in the series circuit to alter the potential at the control electrode for consistently driving the first switch means to an initially conductive condition, while maintaining said second switch means non-conductive, upon connection of the direct current source to thereby initiate production of the periodic output waveform; and means including voltage reference means responsive to the output signal for providing a bias voltage to the bias means once alternately conducting operation of the first and second switch means has been established, the bias voltage being effective to cause the bias means to maintain substantially non-conductive the current path between the input and output terminals of the current control means only when values of the output waveform voltage are above a predetermined value.

2. In an oscillator of the type including first and second switching transistors having base, emitter and collector electrodes, a center-tapped output winding having a pair of end terminals connected to respective ones of the collector and emitter electrodes of the first and second switching transistors, the other of the respective collector and emitter electrodes being connected to a common terminal, a direct current source having one terminal connected to the center tap of the output winding and another terminal connected to the common terminal, and a pair of feedback windings each having one terminal joined to the common terminal and a second terminal connected to the base of a respective one of the switching transistors, the feedback windings being coupled to the output winding to provide signals for biasing the first and second switching transistors to alternately conducting states thereby to develop a periodic output waveform across the output winding, the combination therewith of a starting circuit for positively initiating alternately conducting operation of the first and second switch means, comprising:

a third transistor having base, emitter and collector electrodes;

means for connecting the emitter and collector electrodes of the third transistor in a direct current circuit exclusive of the feedback windings between one of the direct current source terminals and the base of the first switching transistor;

a bias circuit connected between the base of the third transistor and the last-named terminal of the direct current source for controllably rendering the current path between the emitter and collector electrodes of the third transistor initially conductive to establish current flow in the series circuit irrespective of the conductive state of said switching transistors, said bias means providing an initial current path for the third transistor base current and establishing a bias potential at said base to render the third transistor substantially nonconductive after a given increment of time;

an impedance connected serially between the base of the first transistor and the other terminal of the direct current source for biasing the first transistor to a conductive state upon current flow in the series circuit; and a further winding connected in series between one of the end terminals of the output winding and the base of the third transistor for providing a periodic signal to the bias means to maintain the third transistor substantially nonconductive once alternately conducting operation of the first and second switch means has been established.

3. In an oscillator of the type including first and second switching transistors having base, emitter and collector electrodes, a center-tapped output winding having a pair of end terminals connected to respective ones of the emitter and collector electrodes of the first and second switching transistors, the other of the respective emitter and collector electrodes being connected to a common terminal, a direct current source having one terminal connected to the center tap of the output winding and another terminal connected to the common terminal, and a pair of feedback windings connected in series with the output winding and between one of the end terminals thereof and the base of a respective one of the switching transistors, the feedback windings being coupled to the output winding to provide signals for biasing the first and second switching transistors to alternately conducting states thereby to develop a periodic output waveform across the output winding, the combination therewith of a starting circuit for positively initiating alternately conducting operation of the first and second switch means, comprising:

a third transistor havin gbase, emitter and collector electrodes;

means for connecting the emitter and collector electrodes of the third transistor in a direct current circuit exclusive of the feedback windings between one of the direct current source terminals and the base of the first switching transistor;

a bias circuit connected between the base of the third transistor and the last-named terminal of the direct current source for controllably rendering the current path between the emitter and collector electrodes of the third transistor initially conductive to establish current flow in the series circuit irrespective of the conductive state of said switching transistors, said bias means providing an initial current path for the third transistor base current and establishing a bias potential at said base to render the third transistor substantially nonconductive after a given increment of time;

an impedance connected serially between the base of the first transistor and the other terminal of the direct current source for biasing the first transistor to a conductive state upon current flow in the series circuit; and a further winding connected in series with one of the feedback windings and responsive to the output signal for providing a bias voltage to the bias means to maintain the third transistor substantially nonconductive once alternately conducting operation of the first and second switch means has been established.

4. In an oscillator of the type including first and second pairs of switch means of which each has input, output and control electrodes, an output inductance connected intermediate and in a respective series path with the input and output electrodes of each switch means of both pairs, a direct current source having terminals connected to impress a direct current potential across each of the series paths, and feedback circuit means responsive to a periodic output signal on the output inductance to provide signals for biasing in unison the switch means of the respective pairs to alternately conducting states, the combination therewith of a starting circuit for positively initiating alternately conducting operation of the switch means of the first and second pairs, comprising:

current control means having input, output and control terminals;

means for connecting the input and output terminals of the current control means in a series circuit exclusive of the feedback circuit means between one of the terminals of the direct current source and the control electrode of one of the switch means in the first pair;

bias means connected to the control terminal of the current control means for controllably rendering the current control means at least initially conductive between the input and output terminals thereof to establish current flow in the series circuit irrespective of the conductive state of the pairs of switch means, said bias means providing a conductive path for current initially received from the control terminal and establishing a bias potential at said control terminal to render the current control means substantially non-conductive after a given increment of time;

means coupled to and responsive to the current flow in the series circuit to alter the potential at the control terminal for bringing the one switch means of the first pair to an initially conductive state, while maintaining the switch means of the second pair in a non-conductive condition;

means connected intermediate one of the input and output terminals of current control means and the control electrode of the other of the switch means in the first pair to provide a second series circuit therebetween upon conduction of said one switch means; and means responsive to the current flow in the second series circuit for initially bringing said other switch means into a conductive state thereby to provide a current path through the output inductance between the terminals of the direct current source.

5. An oscillator according to claim 4 in which:
the feedback means includes a plurality of feedback windings inductively coupled to the output inductance and each connected between the control and input electrodes of a respective switch means, and the means responsive to current flow in the second series circuit comprises a direct current impedance element connected in series with the feedback winding between the input and control electrodes of said other switch means.

6. An oscillator according to claim 4, further comprising:

unidirectional conducting means in the second series circuit for electrically isolating the control electrode of said other switch means from the current control means when the current control means is in a substantially nonconductive state.

References Cited
UNITED STATES PATENTS

| | | | |
|---|---|---|---|
| 3,098,200 | 7/1963 | Jensen | 331—113 |
| 2,922,958 | 1/1960 | Dean | 331—113 |
| 2,950,446 | 8/1960 | Humez et al. | 331—113 |
| 3,085,211 | 4/1963 | Jensen et al. | 331—113 |
| 3,098,201 | 7/1963 | Smedema et al. | 331—113 |
| 3,159,799 | 12/1964 | Cooper | 331—113 |
| 3,160,830 | 12/1964 | Murphy | 331—113 |
| 3,247,466 | 4/1966 | Mayer | 331—113 |

JOHN KOMINSKI, *Primary Examiner.*

U.S. Cl. X.R.

321—2; 331—114